United States Patent
Friederichs et al.

(10) Patent No.: US 11,155,659 B2
(45) Date of Patent: Oct. 26, 2021

(54) DIMETHYL-SILYL-BRIDGED-1-SUBSTITUTED-2-INDENYL METALLOCENE COMPLEXES FOR OLEFIN POLYMERIZATION

(71) Applicant: SABIC GLOBAL TECHNOLOGIES B.V., Bergen op Zoom (NL)

(72) Inventors: Nicolaas Hendrika Friederichs, Geleen (NL); Antonio Vittoria, Geleen (NL); Roberta Cipullo, Geleen (NL); Vincenzo Busico, Geleen (NL); Ilya Borisov, Geleen (NL); Alexander Voskoboynikov, Geleen (NL); Bogdan A. Guzeev, Geleen (NL); Dmitry Y. Mladentsev, Geleen (NL); Mikhail I. Sharikov, Geleen (NL); Dmitry Uborsky, Geleen (NL); Hendriksen Coen, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 116 days.

(21) Appl. No.: 16/500,645

(22) PCT Filed: Apr. 4, 2018

(86) PCT No.: PCT/EP2018/058625
§ 371 (c)(1),
(2) Date: Oct. 3, 2019

(87) PCT Pub. No.: WO2018/185173
PCT Pub. Date: Oct. 11, 2018

(65) Prior Publication Data
US 2020/0115478 A1    Apr. 16, 2020

(30) Foreign Application Priority Data

Apr. 4, 2017 (EP) .................... 17164678

(51) Int. Cl.
| | | |
|---|---|---|
| *C07F 17/00* | (2006.01) | |
| *C08F 4/64* | (2006.01) | |
| *C08F 4/76* | (2006.01) | |
| *C08F 210/16* | (2006.01) | |
| *C08F 4/6392* | (2006.01) | |

(52) U.S. Cl.
CPC ............ *C08F 210/16* (2013.01); *C07F 17/00* (2013.01); *C08F 4/63927* (2013.01); *C08F 4/64* (2013.01); *C08F 2410/01* (2013.01); *C08F 2420/01* (2013.01)

(58) Field of Classification Search
CPC ................ C07F 17/00; C08F 4/63927
See application file for complete search history.

(56) References Cited

U.S. PATENT DOCUMENTS

| | | | |
|---|---|---|---|
| 5,071,808 A | 12/1991 | Antberg et al. | |
| 6,232,484 B1* | 5/2001 | Schaverien | C07C 13/465 526/160 |
| 6,342,622 B1* | 1/2002 | Arts | C07F 17/00 556/53 |
| 6,693,156 B1* | 2/2004 | Resconi | C07F 17/00 526/165 |
| 6,800,706 B1* | 10/2004 | Kanamaru | C08F 10/06 526/160 |
| 9,000,200 B2* | 4/2015 | Al-Humydi | C07F 7/00 556/53 |

(Continued)

FOREIGN PATENT DOCUMENTS

| | | |
|---|---|---|
| EP | 1132421 A2 | 9/2001 |
| EP | 1153944 A1 | 11/2001 |

(Continued)

OTHER PUBLICATIONS

Kelly, P.A.; Berger, G.O.; Wyatt, J.K.; Nantz, M.H. J. Org. Chem. 2003, 68, 8447-8452. (Year: 2003).*

(Continued)

*Primary Examiner* — Rip A Lee
(74) *Attorney, Agent, or Firm* — Cantor Colburn LLP

(57) ABSTRACT

The invention relates to a metallocene complex according to formula A, wherein R1-R10 are independently selected from H, C1-C10 alkyl, C7-C20 Aralkyl groups, and C1-C10 alkoxy groups; wherein R11 is selected from methyl, ethyl, propyl, isopropyl, butyl, phenyl; wherein R1 and R2, R3 and R4, R4 and R5, R5 and R6, R7 and R8, R8 and R9, and/or R9 and R10 can be connected to form a ringstructure; wherein R0 is selected from a C1-C10 alkyl group or an aryl group wherein M is selected from Ti, Zr and Hf, X is an anionic ligand to M, z is the number of X groups and equals the valence of M minus 2. The invention further relates to a catalyst for preparing polyolefins, a process for polymerizing olefins and to polymers prepared by said catalyst system.

(A)

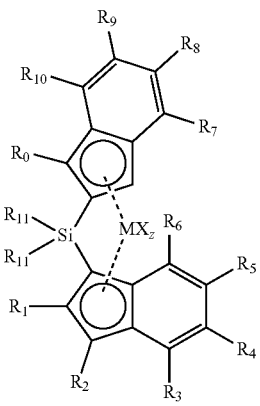

18 Claims, No Drawings

(56) References Cited

U.S. PATENT DOCUMENTS

| | | | |
|---|---|---|---|
| 9,156,929 B2* | 10/2015 | Al-Shammari | C08F 4/00 |
| 9,938,360 B2* | 4/2018 | Vadake Kulangara | C08F 210/16 |
| 10,005,858 B2* | 6/2018 | Al-Shammari | C07F 5/027 |
| 2003/0104928 A1 | 6/2003 | Holtcamp | |
| 2014/0179884 A1 | 6/2014 | McCullough | |
| 2015/0119539 A1 | 4/2015 | McCullough | |
| 2021/0115080 A1 | 4/2021 | Friederichs et al. | |

FOREIGN PATENT DOCUMENTS

| | | | | |
|---|---|---|---|---|
| JP | 8-127612 A | * | 5/1996 | C08F 4/642 |
| JP | 2001-220404 A | * | 8/2001 | C08F 10/00 |
| JP | 2001302687 A | | 10/2001 | |
| WO | 9411406 A1 | | 5/1994 | |
| WO | 2014099303 A1 | | 6/2014 | |
| WO | 2014099307 A1 | | 6/2014 | |
| WO | 2015065681 A1 | | 5/2015 | |
| WO | 20180185170 A1 | | 10/2018 | |

OTHER PUBLICATIONS

Christopher, J.N.; Jordan, R.F.; Petersen, J.L.; Young, V.G. Organometallics 1997, 16, 3044-3050. (Year: 1997).*

International Search Report and Written Opinion of International Application No. PCT/EP2018/058622, International Filing Date Apr. 4, 2018, dated Jun. 12, 2018, 12 pages.

International Search Report and Written Opinion of International Application No. PCT/EP2018/058625, International Filing Date Apr. 4, 2018, dated Jun. 8, 2018, 13 pages.

Christopher J. et al., Synthesis and Structures of rac-Me2Si(è5-1-indenyl)2Hf(NMe2)2 and {Me2Si(è5-1-indenyl) (è3-2-indenyl)}Hf(NMe2)2, Organometallics, 1997, 16, 3044-3050.

Lewkebandara, et al., Adducts of titanium tetrachloride with organosulfur compounds. Crystal and molecular structures of TiCI4(C4H8S)2 and (TiCI4)2(CH3SSCH3), Polyhedron, 1998, vol. 17, No. 1, pp. 1-9.

Nantz et al., Synthesis of [Ethylene-1-(n5-4,5,6,7-tetrahydro-1-indenyl)-2-(n5-4',5',6',7'-tetrahydro-2'-indenyl)]titanium Dichloride, the Elusive Isomer of the Brintzinger-Type, Journal of Organic Chemistry 2003, 68, 8447-8452.

Peacock Andrew J., "Handbook of Polyethylene", Chapter 3 Production Processes, 2000, Marcel Dekker, Inc., New York; ISBN 0824795466; p. 43-66.

Randall, "A Review of High Resolution Liquid 13Carbon Nuclear Magnetic Resonance Characterizations of Ethylene-Based Polymers" Rev. Macromol. Chem. Phys., C.29, V. 2 & 3, 1989, 16 pages.

Rudin, "Practical Aspects of Molecular Weight Measurements" Modern Methods of Polymer Characterization, John Wiley & Sons, New York (1991) pp. 103-112.

Sassmannshausen, Chemistry of Half-Sandwich Compounds of Zirconium: Evidence for the Formation of the Novel ansa Cationic-Zwitterionic Complex [Zr(n:n-C5H4CMe2C6H4Me-p)(u-MeB(CbF5)3)]+[MeB(C6F5)3], Organometallics, 2000, vol. 19, pp. 482-489.

Seenivasan, et al., "Spectroscopic Investigation of Heterogeneous Ziegler-Natta Catalysts: Ti and Mg Chloride Tetrahydrofuranates, Their Interaction Compound, and the Role of the Activator", Chemistry—a European Journal, 2011, vol. 17, pp. 8648-8656.

Waymouth et al., "Investigation of Bridge and 2-Phenyl Substituent Effects on Ethylene/ a-Olefin Copolymerization Behavior with 1,2'-Bridged Bis(indenyl)zirconium Dichlorides", Macromolecules 2004, 37, 2342-2347.

Zimm et al.; "The Dimensions of Chain Molecules Containing Branches and Rings"; J. Chem. Phys. 17; 1949; pp. 1301-1314.

Kashimura, T. et al.; Transition metal compounds, there olefin polymerization catalysts, polymerization of olefins using the same, and high-molecular-weight polyolefins therefrom, JPN. Kokai Tokkyo Koho, 18 pp. 2001, English abstract.

* cited by examiner

DIMETHYL-SILYL-BRIDGED-1-SUBSTITUTED-2-INDENYL METALLOCENE COMPLEXES FOR OLEFIN POLYMERIZATION

CROSS REFERENCE TO RELATED APPLICATIONS

This application is a National Stage application of PCT/EP2018/058625, filed Apr. 4, 2018, which claims the benefit of European Application No. 17164678.9, filed Apr. 4, 2017, both of which are incorporated by reference in their entirety herein.

The invention relates to substituted 2-indenyl metallocene complexes, a catalyst comprising a substituted 2-indenyl metallocene complex, a process for the preparation of a ligand, a process for the preparation of olefin polymers in the presence of substituted 2-indenyl metallocene complexes, the use of the olefin polymers for making articles and articles comprising an olefin polymer.

Metallocene complexes together with a cocatalyst form catalysts that are widely used for olefin polymerization. In general in this context, metallocene complexes are described to have only one type of active species in the polymerization and are often mentioned to be single site catalysts or alternatively single-center catalysts. This terminology is often used to distinguish metallocene based catalysts from heterogeneous Ziegler-Natta type catalysts, which contain multiple active species. The presence of one type of active site is believed to result in polymers having a narrow molecular weight distribution (MWD) and in the case of copolymers result in a narrow comonomer composition distribution (CCD). An additional advantage of metallocene catalysts is their high activity and well-defined structures compared to traditional Ziegler-Natta catalysts. A general feature of metallocene catalysts is that they contain two cyclopentadienyl based ligands, which can be linked together by a connecting moiety, often referred to as a bridging moiety or bridge.

Numerous patent application are known describing metallocene catalysts. For example, WO2014/099307 describes metallocene catalysts for the polymerization of ethylene to branched polyethylene made using Me$_2$Si (2,3,4,5 tetramethyl-1-cyclopentadienyl)(3-phenyl-1-indenyl zirconiumdichloride WO94/11406 discloses 2-indenyl complexes for olefin polymerization.

WO2015/065681 describes metallocenes having a bridged ligand system containing a 1-indenyl moiety, having an aryl substituent on the 4 position and an hydrocarbyl group on the 2-position of the 1-indenyl.

US2015/0119539 describes metallocenes having a (2-alkyl-4-aryl-1-indenyl) connected via Me$_2$Si bridge to a tetramethyl-cyclopentadienyl ligand. Here the aryl ligand is attached to the aromatic 6-ring of the indenyl ligand, specifically on the 4 position.

WO2014/099303 describes metallocenes having a Me$_2$Si-bridged (3-aryl-1-indenyl-tetramethylcyclopentadienyl) ligand system.

US20140179884 describes metallocenes containing Me$_2$Si bridged tetramethylcyclopentadienyl 3-aryl-1-indenyl systems.

*Macromolecules* 2004, 37, 2342-2347 (Robert Waymouth et al.) describes an investigation of the type of bridge and the effect of a 2-phenyl substituent effects on ethylene-alfa olefin copolymerization behavior with 1,2' bridged bis(indenyl) zirconium complexes.

Journal of Organic Chemistry 2003, 68, 8447-8452 (Michael H. Nantz et al.) describes the synthesis of titanium based compounds containing a 2-indenyl moiety linked via an ethylene bridge to a 1-indenyl moiety.

JP2001302687A describes dimethylsilylene-(1-(2-alkyl-4,5-benzoindenyl),(2-indenyl) zirconium dichloride, where the alkyl is methyl, ethyl or butyl.

Despite all efforts, there is a need for a highly active catalyst, which is able to produce polyolefins in a high yield, having a high reactivity for alfa olefin copolymerization (like for example copolymerization of ethylene with 1-hexene) and which is still giving high molecular weight polymers.

A new family of metallocene complexes has now been discovered which advantageously can be used for olefin polymerization, preferably for ethylene copolymerization, and which gives at least one advantage of a higher catalyst activity, a higher alfa olefin (for example 1-hexene) incorporation and/or a high molecular weight polymer.

SUMMARY OF THE INVENTION

The invention relates to a metallocene complex according to formula A

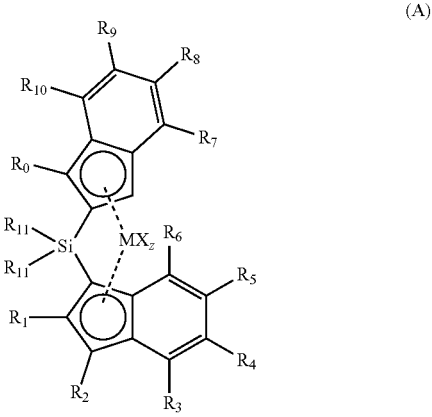

(A)

wherein R1-R10 are independently selected from H, C1-C10 alkyl, C7-C20 Aralkyl groups, and C1-C10 alkoxy groups;

wherein R11 is selected from methyl, ethyl, propyl, isopropyl, butyl, phenyl;

wherein R1 and R2, R3 and R4, R4 and R5, R5 and R6, R7 and R8, R8 and R9, and/or R9 and R10 can be connected to form a ringstructure;

wherein R0 is selected from a C1-C10 alkyl group or an aryl group wherein M is selected from Ti, Zr and Hf, X is an anionic ligand to M, z is the number of X groups and equals the valence of M minus 2.

In a particular embodiment, the invention relates to a metallocene complex according to formula I,

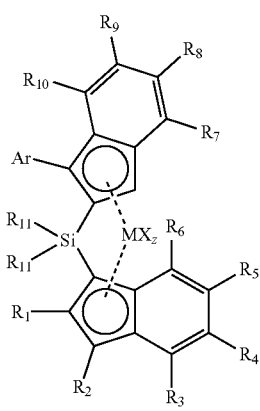

(I)

wherein R1-R10 are independently selected from H, C1-C10 alkyl, C7-C20 Aralkyl groups, and C1-C10 alkoxy groups;

wherein Ar is an aryl group;

wherein R11 is selected from methyl, ethyl, propyl, isopropyl, butyl, phenyl;

wherein R1 and R2, R3 and R4, R4 and R5, R5 and R6, R7 and R8, R8 and R9, and/or R9 and R10 can be connected to form a ringstructure;

wherein M is selected from Ti, Zr and Hf, X is an anionic ligand to M, z is the number of X groups and equals the valence of M minus 2.

The metallocene complex according to the invention surprisingly can copolymerize ethylene with alfa olefins in a high yield with a very high alfa olefin incorporation, and/or a very high molecular weight. This copolymerization can take place in the presence of a cocatalyst and under suitable polymerization conditions.

DETAILED DESCRIPTION

The metallocene complex according to the present invention has the general structure according to formula A:

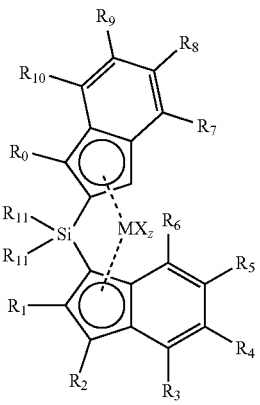

(A)

wherein R1-R10 are independently selected from H, C1-C10 alkyl, C7-C20 Aralkyl groups, and C1-C10 alkoxy groups;

wherein R11 is selected from methyl, ethyl, propyl, isopropyl, butyl, phenyl;

wherein R1 and R2, R3 and R4, R4 and R5, R5 and R6, R7 and R8, R8 and R9, and/or R9 and R10 can be connected to form a ringstructure;

wherein R0 is selected from a C1-C10 alkyl group or an aryl group wherein M is selected from Ti, Zr and Hf, X is an anionic ligand to M, z is the number of X groups and equals the valence of M minus 2.

R0 may for example be a methyl, ethyl, n-propyl, isopropyl, n-butyl, isobutyl, sec-butyl, tert-butyl, n-pentyl, sec-pentyl, isopentyl, neopentyl, cyclopentyl, n-hexyl, sec-hexyl, tert-hexyl, isohexyl, neohexyl, cyclohexyl, or aryl group. For example, R0 may for example be a methyl, ethyl, isopropyl or aryl group. For example, R0 may be a methyl, ethyl, isopropyl or phenyl group.

In a particular embodiment, the metallocene complex according to the present invention has the general structure according to formula I:

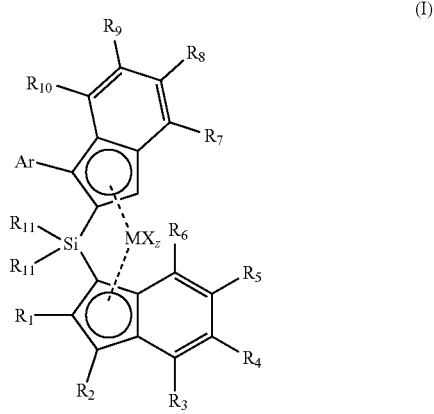

(I)

wherein R1-R10 are independently selected from H, C1-C10 alkyl, C7-C20 aralkyl groups, and C1-C10 alkoxy groups;

wherein Ar is an Aryl group;

wherein R11 is selected from methyl, ethyl, propyl, isopropyl, butyl and phenyl or aryl;

wherein R1 and R2, R3 and R4, R4 and R5, R5 and R6, R7 and R8, R8 and R9, and/or R9 and R10 can be connected to form a ringstructure;

wherein M is selected from Ti, Zr and Hf, X is an anionic ligand to M, z is the number of X groups and equals the valence of M minus 2.

Preferably M is zirconium or hafnium.

Preferably M is connected to 2 monovalent anionic groups, selected from the group consisting of halogen (F, Cl, Br or I), a C1-C20 hydrocarbyl group or a C1-C20 alkoxy group. Preferably X is a methyl group, Cl, Br or I, most preferably methyl or Cl.

The metallocene complex comprises a 1-aryl substituted 2-indenyl group which is bridged through a disubstituted alkyl-silyl bridge to a 1-indenyl group, which 1-indenyl group is preferably substituted with one or more substituents.

The Ar group at the 1 position of the 2-indenyl group is preferably a C6-C24 aryl group, more preferably a substituted or unsubstituted phenyl group, most preferably a phenyl group.

Preferably R7-R10 are independently selected from H, methyl, ethyl and methoxy, more preferably R7-R10 are H.

The 2-indenyl and 1-indenyl group are preferably coupled through an dihydrocarbyl substituted silyl bridge. More preferably the dihydrocarbyl substituted silyl bridge is a dimethylsilyl bridge, which means that R11 is a methyl group.

The 1-indenyl group can contain substituents independently selected from C1-C10 alkyl, C6-C20 aryl, C7-C20 aralkyl groups, and C1-C10 alkoxygroups, wherein R1 and R2, R3 and R4, R4 and R5, or R5 and R6 can be connected to form a ring structure.

In a preferred embodiment R5 and R6 are H atoms.

In a preferred embodiment R1 is selected from H, methyl, ethyl, and isopropyl. When R1 is other than H, preferably R2 is H. For example, R1 may be selected from methyl, ethyl, and isopropyl.

R2 may for example be selected from H, methyl, ethyl, isopropyl, phenyl, 2-methyl-1-phenyl, 3,5-dialkyl-1-phenyl, preferably 3,5-dimethyl-1-phenyl, 3,5-diethyl-1-phenyl, 3,5-diisopropyl-1-phenyl or 3,5-ditertiairbutyl-1-phenyl.

In a preferred embodiment, R2 is selected from H, methyl, ethyl, phenyl, 2-methyl-1-phenyl, 3,5-dialkyl-1-phenyl, preferably 3,5-dimethyl-1-phenyl, 3,5-diethyl-1-phenyl, 3,5-diisopropyl-1-phenyl or 3,5-ditertiairbutyl-1-phenyl. For example, R2 may be selected from H, methyl, ethyl, isopropyl or phenyl. Preferably R2 is selected from H, methyl, ethyl and phenyl. When R2 is other than H, R1 is preferably a H. For example, R2 may be selected from methyl, ethyl, isopropyl or phenyl. For example, R2 may be selected from methyl, ethyl or isopropyl.

In a particular exemplary embodiment, R1 is selected from methyl, ethyl and isopropyl, and R2 is H. In another exemplary embodiment, R1 is methyl and R2 is H. In another exemplary embodiment, R1 is ethyl and R2 is H. In another exemplary embodiment, R1 is isopropyl and R2 is H.

In another particularly exemplary embodiment, R1 is H and R2 is selected from methyl, ethyl, isopropyl and phenyl. In another exemplary embodiment, R1 is H and R2 is methyl. In another exemplary embodiment, R1 is H and R2 is ethyl. In another exemplary embodiment, R1 is H and R2 is isopropyl. In another exemplary embodiment, R1 is H and R2 is phenyl.

In another particular embodiment of the invention is:
R0 selected from a methyl, ethyl, n-propyl, isopropyl, n-butyl, isobutyl, sec-butyl, tert-butyl, n-pentyl, sec-pentyl, isopentyl, neopentyl, cyclopentyl, n-hexyl, sec-hexyl, tert-hexyl, isohexyl, neohexyl, cyclohexyl, or aryl group;
R1 selected from H, methyl, ethyl, or isopropyl; and
R2 selected from H, methyl, ethyl, isopropyl or phenyl.
In yet another particular embodiment of the invention,
R0 is selected from a methyl, ethyl, n-propyl, isopropyl, n-butyl, isobutyl, sec-butyl, tert-butyl, n-pentyl, sec-pentyl, isopentyl, neopentyl, cyclopentyl, n-hexyl, sec-hexyl, tert-hexyl, isohexyl, neohexyl, cyclohexyl, or aryl group;
R1 is H; and
R2 is selected from methyl, ethyl, isopropyl or phenyl.
In yet another particular embodiment of the invention, R0 is selected from a methyl, ethyl, n-propyl, isopropyl, n-butyl, isobutyl, sec-butyl, tert-butyl, n-pentyl, sec-pentyl, isopentyl, neopentyl, cyclopentyl, n-hexyl, sec-hexyl, tert-hexyl, isohexyl, neohexyl, cyclohexyl, or aryl group;
R1 is selected from methyl, ethyl, or isopropyl; and
R2 is H.
In yet another particular embodiment of the invention,
R0 is selected from a methyl, ethyl, isopropyl or phenyl group;
R1 is selected from H, methyl, ethyl, or isopropyl; and
R2 is selected from H, methyl, ethyl, isopropyl or phenyl.
In yet another particular embodiment of the invention,
R0 is selected from a methyl, ethyl, isopropyl or phenyl group;
R1 is selected from methyl, ethyl, or isopropyl; and
R2 is H.
In yet another particular embodiment of the invention,
R0 is selected a methyl, ethyl, isopropyl or phenyl group;
R1 is H; and
R2 is selected from methyl, ethyl, isopropyl or phenyl.

R3 and R4 are each selected from H, methyl, ethyl or they can form a fused ring together with the atoms to which they are bound, preferably a 5 or 6 membered aliphatic or aromatic ring-structure.

In case either R1 or R2 are substituted with a small alkyl group (methyl, ethyl, n-propyl, isopropyl), the catalysts show an increase in molecular weight of the resulting polymer (Mn and Mw) as compared to the unsubstituted analog.

In case R2 is a phenyl group, the activity and comonomer reactivity increase relative to the unsubstituted analog.

In a preferred embodiment of the present invention, it has been found that metallocene complexes with R1 is methyl, ethyl, isopropyl and/or R2 is selected from methyl, ethyl, phenyl group and R3, R4, R5 and R6 are H are very active in ethylene alfa-olefin copolymerization and show a good alfa olefin incorporation, high molecular weight and increase in activity when an alfa-olefin monomer is present.

In an embodiment, the metallocene complexes are selected from the group consisting of:

Cat 83 rac-C$_1$-I          rac-C$_1$-II

-continued

Cat 85
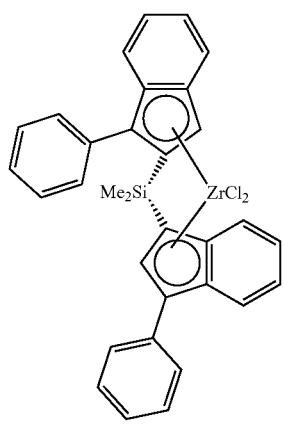

Cat 86
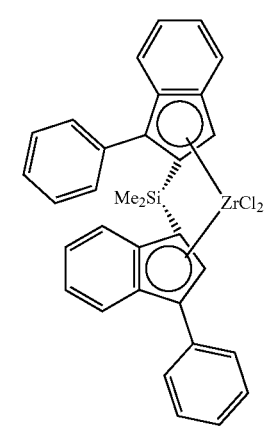

Cat 87
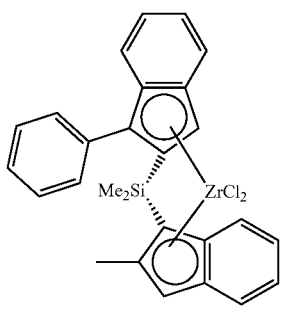

Cat 89
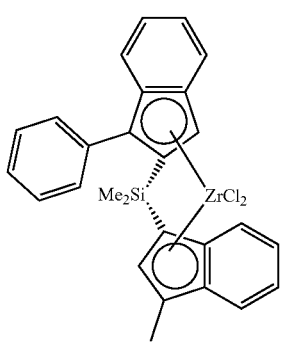

-continued

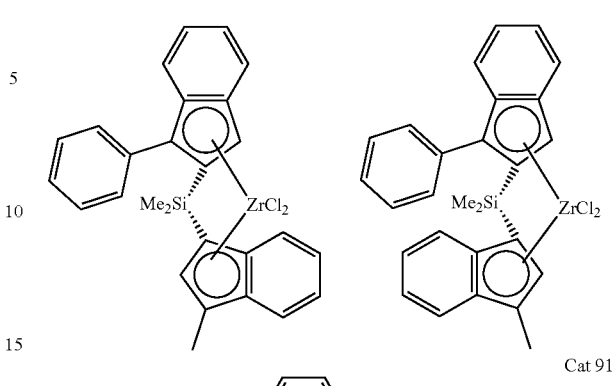
Cat 90

Cat 91
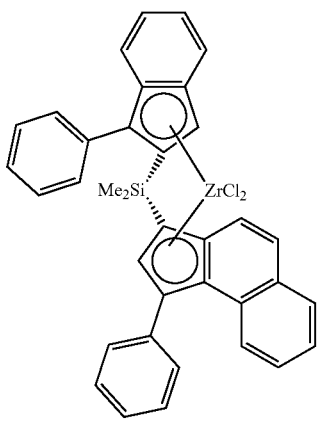

Support

The metallocene complex can be immobilized on a support. The support is preferably an inert support, more preferably a porous inert support. Examples of porous inert supports materials are talc, clays and inorganic oxides. Preferably, the support material is in a finely divided form.

Suitable inorganic oxide materials include group 2A, 3A, 4A and 4B metal oxides such as silica, alumina and mixtures thereof. Other inorganic oxides that may be employed either alone or in combination with the silica or alumina are magnesia, titania, zirconia and the like. Other support materials, however, can be employed, for example finely divided functionalized polyolefins such as finely divided polyethylene.

Preferably, the support is a silica having a surface area between 200 and 900 m²/g and a pore volume between 0.5 and 4 ml/g.

Catalyst

The invention is also directed to a catalyst prepared from the metallocene complex according to the invention and a cocatalyst. The cocatalyst should be capable to generate a cationic specie from the metallocene compound and form a so-called non- or weakly coordinating anion. Suitable cocatalysts include aluminium- or boron-containing cocatalysts. Suitable aluminium-containing cocatalysts comprise aluminoxanes, alkyl aluminium compounds and aluminium-alkyl-chlorides. The aluminoxanes usable according to the present invention are well known and preferably comprise oligomeric linear and/or cyclic and/or cage-like alkyl aluminoxanes represented by the formula: $R^3$—$(AlR^3$—$O)_n$—

$AlR^3{}_2$ for oligomeric, linear aluminoxanes and ($-AlR^3-$O$-)_m$ for oligomeric, cyclic aluminoxanes; wherein n is 1-40, preferably n is 10-30; m is 3-40, preferably m is 3-30 and $R^3$ is a $C_1$ to $C_8$ alkyl group and preferably a methyl group. Further other organoaluminum compounds can be used such as trimethylaluminum, triethylaluminium, triisopropylaluminum, tri-n-propylaluminum, triisobutylaluminum, tri-n-butylaluminum, triamylaluminium; dimethylaluminium ethoxide, diethylaluminium ethoxide, diisopropylaluminium ethoxide, di-n-propylaluminium ethoxide, diisobutylaluminium ethoxide and di-n-butylaluminium ethoxide; dimethylaluminium hydride, diethylaluminium hydride, diisopropylaluminium hydride, di-n-propylaluminium hydride, diisobutylaluminium hydride and di-n-butylaluminium hydride.

Suitable boron-containing cocatalysts include trialkylboranes, for example trimethylborane or triethylborane and/or perfluoroarylborane and/or perfluoroarylborate-compounds.

In the process to produce olefin polymers by polymerizing one or more olefins in the presence of a metallocene complex preferably an organoaluminum cocatalyst and/or a perfluoroborate cocatalyst is present.

More preferably, methylaluminoxane, trialkylboranes, perfluoroarylboranes or perfluoroarylborates are used as the cocatalyst.

Olefin Polymerization

In another aspect, the invention relates to a process for the preparation of olefin polymers by polymerizing one or more olefins in the presence of a cocatalyst and the metallocene complex of the invention, wherein the metallocene complex optionally is immobilized on a support.

The process to produce the olefin polymers may start with the reaction of the metallocene complex according to the invention with the cocatalyst. This reaction can be performed in the same vessel as the reaction vessel wherein the olefin polymers are produced or in a separate vessel, whereafter the mixture of the metallocene complex and the cocatalyst is fed to the reaction vessel. During the reaction described above an inert solvent can be used.

The polymerization, can be adequately carried out in a slurry process, a solution process or a gasphase process.

In the mixture of the metallocene complex and an organoaluminium cocatalyst, the cocatalyst is used in an amount of 10 to 100,000 mol, preferably from 10 to 10,000 mol per mol of the transition metal compound.

In the mixture of the metallocene complex and an organoborane or organoborate cocatalyst, the cocatalyst is used in an amount of 0.1 to 100 mol, preferably from 0.5 to 100 mol per mol of the transition metal compound.

The solvent used in a slurry process to produce olefin polymers may be any organic solvent usually used for the polymerization. Examples of solvents are benzene, toluene, xylene, propane, butane, pentane, hexane, heptane, cyclohexane and methylene chloride. Also the olefin to be polymerized can be used as the solvent.

In the process to produce olefin polymers the polymerization conditions, like for example temperature, time, pressure, monomer concentration can be chosen within wide limits. The polymerization temperature is in the range from −100 to 300° C., preferably 0 to 200° C., more preferably 50 to 200° C. The polymerization time is in the range of from 10 seconds to 20 hours, preferably from 1 minute to 10 hours, more preferably from 5 minutes to 5 hours. The ethylene pressure during polymerization is in the range from 1 to 3500 bar, preferably from 1 to 2500 bar, more preferably from 1 to 1000 bar, even more preferably from 1 to 500 bar, most preferably from 1 to 100 bar. The molecular weight of the polymer can be controlled by use of hydrogen in the polymerization. The polymerization may be conducted by a batch process, a semi-continuous process or a continuous process and may also be conducted in two or more steps of different polymerization conditions. The polyolefin produced is separated from the polymerization solvent and dried by methods known to a person skilled in the art.

In the process to produce olefin polymers the olefin which is polymerized can be one type of olefin or can be mixtures of different olefins. The polymerization thus includes homopolymerization and copolymerization. Examples of olefins are α-olefins such as ethylene, propylene, 1-butene, 1-pentene, 4-methyl-1-pentene, 1-hexene, 1-octene, 1-nonene, 1-decene; conjugated and non-conjugated dienes such as butadiene, 1,4-hexadiene, 5-ethylidene-2-norbornene, dicyclopentadiene, 4-methyl-1,4-hexadiene and 7-methyl-1,6-octadiene; cyclic olefins such as cyclobutene and other olefinic compounds such as isobutene, vinyl-cyclohexane and styrene but is not limited thereto.

Preferably, at least one of the olefins that is polymerized is ethylene. More preferably, a mixture of ethylene and at least one comonomer of 3 or more carbon atoms is polymerized.

Preferably, the comonomer of 3 or more carbon atoms is chosen from 1-butene, 1-hexene, 1-octene, vinylcyclohexane or 4-methyl-1-pentene.

Preferably, the olefin comonomer is present in an amount of about 5 to about 50 percent by weight of the ethylene-olefin copolymer, more preferably an amount of from about 7 to about 40 percent by weight of the ethylene α-olefin copolymer.

For example a linear low density polyethylene (LLDPE) having a melt mass flow rate (also known as melt flow index) as determined using ASTM D1238-10 (190° C./2.16 kg) which ranges from 0.5 to 125 g/10 min and a density in the range from 900 kg/m³ to less than 940 kg/m³ as determined using ASTM D1505-10 may be obtained. For example, the density of the LLDPE ranges from about 915 kg/m³ to less than 940 kg/m³, for example between 915 and 925 kg/m³. For example, the melt flow index of the LLDPE ranges from 0.3 to 3 g/10 min.

The polymerisation may be performed via a gas phase process, via a slurry process or via a solution process. The production processes of polyethylene are summarised in "Handbook of Polyethylene" by Andrew Peacock (2000; Dekker; ISBN 0824795466) at pages 43-66.

The various processes may be divided into solution polymerisation processes employing homogeneous (soluble) catalysts and processes employing supported (heterogeneous) catalysts. The latter processes include both slurry and gas phase processes.

When carrying out a slurry or gasphase process, a so-called continuity agent or anti-static agent or anti-fouling agent may be added to reactor.

When employing the metallocene catalysts in the polymerization of olefins, a so-called impurity scavenger may be added to the reactor. Suitable impurity scavengers are organometal compounds, like alkyl aluminium or alkyl magnesium compounds.

The invention is also directed to a polyolefin, for example polyethylene, preferably high density polyethylene (HDPE) obtainable or obtained by the process of the invention, for example by copolymerizing ethylene and at least one other olefin in the presence of a metallocene complex according to the invention or a composition, wherein the metallocene complex according to the invention is immobilized on a support.

As defined herein, in linear polyethylene, the term "linear" means that the polymer is substantially linear, but may contain some long chain branching.

"Long chain branching" (LCB) means a chain length longer than the short chain branch that results from the incorporation of the α-olefin(s) into the polymer backbone. Each long chain branch will have the same comonomer distribution as the polymer backbones and can be as long as the polymer backbone to which it is attached.

As a practical matter, current $^{13}C$ nuclear magnetic resonance spectroscopy cannot distinguish the length of a long chain branch in excess of six carbon atoms. However, there are other known techniques useful for determining the presence of long chain branches in ethylene polymers. Two such methods are gel permeation chromatography coupled with a low angle laser light scattering detector (GPC-LALLS) and gel permeation chromatography coupled with a differential viscometer detector (GPC-DV). In addition, melt-rheology, for example determining the behavior of the polymer melt under different shear rates, is frequently used to indicate the presence of long chain branching. The use of these techniques for long chain branch detection and the underlying theories have been well documented in the literature.

See, for example, Zimm, G. H. and Stockmayer, W. H., J. Chem. Phys., 17, 1301 (1949) and Rudin, A., Modern Methods of Polymer Characterization, John Wiley & Sons, New York (1991 pp. 103-112).

It has been found that with the metallocene complex of the invention or with the composition of the invention wherein the metallocene complex of the invention is present on a support, it is possible to produce polyethylene from ethylene and at least one other olefin, for example an olefin having up to 8 carbon atoms, with a high incorporation of the at least one other olefin.

The amount of incorporation of the at least one other olefin, for example an α-olefin in the polyethylene is expressed by the amount of branches per 1000 carbon atoms.

The presence of short chain branching of up to 6 carbon atoms in length can be determined in ethylene polymers by using nuclear magnetic resonance (NMR) spectroscopy and is quantified using the method described by Randall (Rev. Macromol. Chem. Phys., C.29, V. 2 & 3, p. 285-297).

Therefore, the invention also relates to a polyolefin, preferably polyethylene, for example linear low density polyethylene (LLDPE). The low density polyethylene, for example LLDPE, preferably has an amount of branches per 1000 carbon atoms as determined using $^{13}C$ NMR of at least 18, for example of at least 19, for example at least 20 and/or for example at most 30, for example at most 25, for example at most 23, for example at most 21.

The number average molecular weight (Mn) of the polyolefin, for example polyethylene, for example LLDPE of the invention may vary between wide ranges and may for example be in the range from 1000 to 200000 Da.

For example, the Mn of the polyolefin of the invention may be at least 1500, for example at least 2000, for example at least 20,000, for example at least 50,000 and/or for example at most 150,000, for example at most 110,000, for example at most 100,000, for example at most 70,000 Da.

The weight average molecular weight (Mw) of the polyolefin, for example polyethylene, for example LLDPE of the invention may also vary between wide ranges and may for example be in the range from 1500 to 500000. For example, the Mw of the polyolefin of the invention may be at least 2500, for example at least 10,000, for example at least 50,000, for example at least 100,000 and/or for example at most 400,000, for example at least 350,000, for example at most 300,000, for example at most 250,000.

For purpose of the invention, the Mw and Mn are determined using SEC (Size Exclusion Chromatography) using 1,2,4-trichlorobenzene or o-dichlorobenzene as an eluent, and calibrated using linear polyethylene or polystyrene standards.

The molecular weight distribution (that is Mw/Mn) of the polyolefin of the invention may for example vary from 2 to 5, from 2.1 to 4 or from 2.5 to 3.5.

The polyolefin obtained or obtainable by the process of the invention may be mixed with suitable additives.

Examples of suitable additives for polyethylene include but are not limited to the additives usually used for polyethylene, for example antioxidants, nucleating agents, acid scavengers, processing aids, lubricants, surfactants, blowing agents, ultraviolet light absorbers, quenchers, antistatic agents, slip agents, anti-blocking agents, antifogging agents, pigments, dyes and fillers, and cure agents such as peroxides. The additives may be present in the typically effective amounts well known in the art, such as 0.001 weight % to 10 weight % based on the total composition.

The polyolefins of the invention and compositions comprising said polyolefins may suitably be used for the manufacture of articles. For example, the polyolefins and compositions of the invention may be manufactured into film, for example by compounding, extrusion, film blowing or casting or other methods of film formation to achieve, for example uniaxial or biaxial orientation. Examples of films include blown or cast films formed by coextrusion (to form multilayer films) or by lamination and may be useful as films for packaging, for example as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets.

Therefore, in another aspect, the invention also relates to articles comprising the polyolefins obtainable by the process of the invention.

In yet another aspect, the invention also relates to use of the polyolefins obtainable by the process of the invention for the preparation of articles, for example for the preparation of films.

In yet another aspect, the invention relates to a process for the preparation of articles using the polyolefin according to the invention.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will hereafter be elucidated by way of the following examples, without being limited thereto.

EXAMPLES

Catalyst Synthesis

Dimethyl(3-phenyl-1H-inden-2-yl)silane

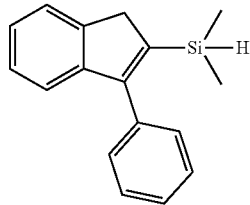 [SMILES: C[SiH](C)C1=C(c2ccccc2)c2ccccc2C1]

A solution of 2-bromo-3-phenyl-1H-indene (27 g, 100 mmol, 1 equiv.) in ether (1000 ml) was cooled to −80° C. and $^t$BuLi (176 ml, 1.7 M in pentane, 300 mmol, 3 equivs.) was added. Cooling bath was removed, and the mixture was allowed to warm to 0° C. Then, the mixture was cooled to −80° C., and THF (250 ml) was added followed by chloro(dimethyl)silane (9.45 g, 100 mmol, 1 equiv.). The mixture was left in the cooling bath to warm slowly and stirred overnight. Further on, a solution of NH$_4$Cl was added, the organic phase was separated, washed with water and dried over Na$_2$SO$_4$. Solvents were then evaporated in vacuo, and the residue was dissolved in hexane. This solution was passed through a pad of silica gel 60 (40-63 um). The filtrate was evaporated in vacuo. The residue was distilled in vacuo and the fraction with b.p. 113-127° C./2 mbar was collected. This procedure gave 19.8 g (63%) of the product as a colorless liquid. The product contained 21 wt % of 3-phenylindene according to NMR. It was used without further purification.

$^1$H NMR (400 MHz, CDCl$_3$): δ 7.59-7.61 (m, 1H), 7.42-7.53 (m, 5H), 7.32-7.35 (m, 3H), 4.36-4.41 (sept, 1H, J=3.8 Hz), 3.66 (s, 2H), 0.20 (d, 6H, J=3.8 Hz).

Chlorodimethyl(3-phenyl-1H-inden-2-yl)silane

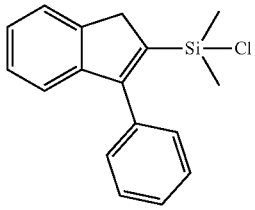 [SMILES: C[Si](C)(Cl)C1=C(c2ccccc2)c2ccccc2C1]

The crude dimethyl(3-phenyl-1H-inden-2-yl)silane (15.0 g, 79 wt %, 47 mmol, 1 equiv.) containing 3-phenylindene (21 wt %) was dissolved in THF (50 ml), and then hexachloroethane (5.6 g, 24 mmol, 0.5 equiv) and PdCl$_2$ (84 mg, 0.47 mmol, 0.01 equiv.) were added. The obtained mixture was stirred for 1 h (until the exothermic reaction ceased), and then all volatiles were removed in vacuo. The residue was distilled in vacuo, and fraction with b.p. 138-142° C./2 mbar was collected. This procedure gave 13.0 g (96%) of the title product as a colorless liquid.

$^1$H NMR (400 MHz, CDCl$_3$): δ 7.59-7.61 (m, 1H), 7.42-7.51 (m, 5H), 7.31-7.33 (m, 2H), 7.23-7.25 (m, 1H), 3.77 (m, 2H), 0.39 (s, 6H).

General Procedure 1. Silylene-Bridged Ligands n-Butyllitium in hexanes (1 equiv) was added dropwise to a solution of the respective indene (1 equiv) in dry ether at room temperature, and the formed mixture was stirred overnight. The desired chlorosilane (1 equiv) was added at −80° C., the obtained mixture was allowed to warm slowly to room temperature and stirred overnight. The resulting mixture was poured into water, the organic layer was separated, and the aqueous layer was extracted with ether. The combined extract was dried over anhydrous sodium sulfate and then evaporated to dryness. The residue was purified by flash chromatography on silica gel 60 (40-64 um) using hexane-dichloromethane mixture (10:1, vol.) as an eluent.

General Procedure 2. Complexes n-Butyllithium in hexanes (2 equiv) was added dropwise to a solution of the respective ligand (1 equiv) in ether at room temperature and the formed mixture was stirred overnight. Then, ZrCl$_4$ (1 equiv) was added at −80° C., and the obtained mixture was allowed to warm slowly to room temperature and stirred overnight. The resulting mixture was evaporated to dryness, toluene was added to the residue, and the resulting suspension was filtered through a pad of Celite 503 (hot filtration may be necessary in case of a low soluble product). The obtained filtrate was evaporated until the precipitation started. Crystals precipitated from this solution overnight at room temperature were collected, washed with small amount of cold toluene, and then dried in vacuum.

(1H-inden-3-yl)dimethyl(3-phenyl-1H-inden-2-yl)silane (L83)

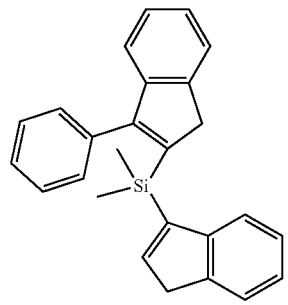 [SMILES: C[Si](C)(C1=CCc2ccccc21)C1=C(c2ccccc2)c2ccccc2C1]

According to the general procedure 1, 5.50 g (81%) of the title compound was obtained from 2.50 g (21.6 mmol) of 1H-indene in 100 ml of ether, 8.6 ml (21.6 mmol, 2.5 M) of n-butyllithium, and 5.10 g (21.6 mmol) of chlorodimethyl(3-phenyl-1H-inden-2-yl)silane.

$^1$H NMR (400 MHz, CDCl$_3$): δ 7.49 (t, 2H, J=6.3 Hz), 7.14-7.34 (m, 11H), 6.72 (t, 1H, J=1.8 Hz), 3.62 (s, 2H), 3.39 (s, 2H), 0.29 (s, 6H).

Dimethyl(3-phenyl-1H-inden-1-yl)(3-phenyl-1H-inden-2-yl)silane (L85)

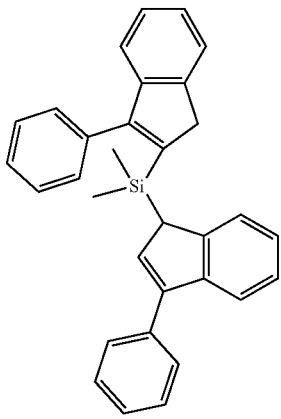 [SMILES: C[Si](C)(C1=C(c2ccccc2)c2ccccc2C1)C1C=C(c2ccccc2)c2ccccc21]

According to the general procedure 1, 5.30 g (77%) of the title compound was obtained from 3.00 g (15.6 mmol) of 3-phenyl-1H-indene in 100 ml of ether, 6.24 ml (15.6 mmol, 2.5 M) of n-butyllithium, and 4.44 g (15.6 mmol) of chlorodimethyl(3-phenyl-1H-inden-2-yl)silane.

$^1$H NMR (400 MHz, CDCl$_3$): δ 7.65 (d, 1H, J=7.4 Hz), 7.55-7.57 (m, 3H), 7.17-7.46 (m, 14H), 6.60 (d, 1H, J=2.0 Hz), 3.64 (s, 1H), 3.55 (s, 2H), −0.07 (s, 3H), −0.10 (s, 3H).

Dimethyl(2-methyl-1H-inden-1-yl)(3-phenyl-1H-inden-2-yl)silane (L87)

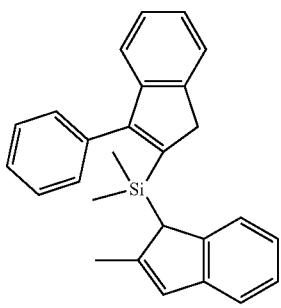 [SMILES: CC1=Cc2ccccc2C1[Si](C)(C)C1=C(c2ccccc2)c2ccccc2C1]

According to the general procedure 1, 4.20 g (72%) of the title compound was obtained from 2.00 g (15.4 mmol) of 2-methyl-1H-indene in 60 ml of ether, 6.14 ml (15.4 mmol, 2.5 M) of n-butyllithium, and 4.38 g (15.4 mmol) of chlorodimethyl(3-phenyl-1H-inden-2-yl)silane.

$^1$H NMR (400 MHz, CDCl$_3$): δ 7.52 (d, 1H, J=7.7 Hz), 7.34-7.45 (m, 5H), 7.24-7.30 (m, 4H), 7.15-7.18 (m, 3H), 6.99 (t, 1H, J=7.5 Hz), 3.47 (s, 2H), 3.37 (s, 1H), 2.06 (s, 3H), −0.08 (s, 3H), −0.14 (s, 3H).

Dimethyl(2-phenyl-1H-inden-1-yl)(3-phenyl-1H-inden-2-yl)silane (L88)

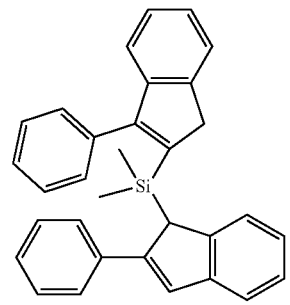 [SMILES: C[Si](C)(C1=C(c2ccccc2)c2ccccc2C1)C1C(c2ccccc2)=Cc2ccccc21]

According to the general procedure 1, 5.00 g (72%) of the title compound was obtained from 3.00 g (15.6 mmol) of 2-phenyl-1H-indene in 100 ml of ether, 6.24 ml (15.6 mmol, 2.5 M) of n-butyllithium, and 4.44 g (15.6 mmol) of chlorodimethyl(3-phenyl-1H-inden-2-yl)silane.

$^1$H NMR (400 MHz, CDCl$_3$): δ 7.15-7.50 (m, 17H), 7.08 (s, 1H), 7.04 (t, 1H, J=7.3 Hz), 4.11 (s, 1H), 3.17-3.39 (m, 2H), −0.29 (s, 3H), −0.52 (s, 3H).

Dimethyl(3-methyl-1H-inden-1-yl)(3-phenyl-1H-inden-2-yl)silane (L89)

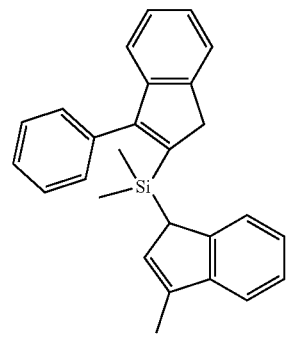 [SMILES: CC1=CC([Si](C)(C)C2=C(c3ccccc3)c3ccccc3C2)c2ccccc21]

According to the general procedure 1, 2.70 g (47%) of the title compound was obtained from 2.00 g (15.4 mmol) of 3-methyl-1H-indene in 60 ml of ether, 6.14 ml (15.4 mmol, 2.5 M) of n-butyllithium, and 4.38 g (15.4 mmol) of chlorodimethyl(3-phenyl-1H-inden-2-yl)silane.

$^1$H NMR (400 MHz, CDCl$_3$): δ 7.52 (d, 1H, J=6.4 Hz), 7.10-7.43 (m, 12H), 6.19 (s, 1H), 3.48 (s, 2H), 3.38 (s, 1H), 2.18 (s, 3H), −0.15 (s, 3H), −0.17 (s, 3H).

Dimethyl(3-phenyl-1H-inden-2-yl)(1-phenyl-3H-cyclopenta[a]naphthalene-3-yl)silane (L91)

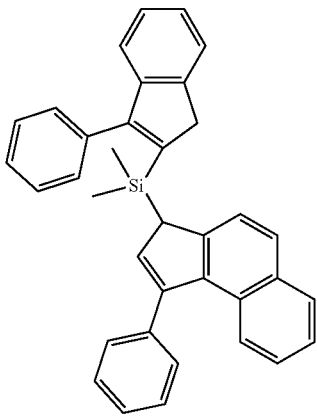 [SMILES: C[Si](C)(C1=C(c2ccccc2)c2ccccc2C1)C1C=C(c2ccccc2)c2c1ccc1ccccc21]

According to the general procedure 1, 5.10 g (73%) of the title compound was obtained from 3.50 g (14.4 mmol) of 1-phenyl-3H-cyclopenta[a]naphthalene in 100 ml of ether, 5.77 ml (14.4 mmol, 2.5 M) of n-butyllithium, and 4.10 g (14.4 mmol) of chlorodimethyl(3-phenyl-1H-inden-2-yl)silane.

$^1$H NMR (400 MHz, CDCl$_3$): δ 7.87 (d, 1H, J=8.1 Hz), 7.75 (d, 1H, J=8.5 Hz), 7.63 (d, 1H, J=8.3 Hz), 7.16-7.54 (m, 17H), 6.54 (d, 1H, J=1.6 Hz), 3.84 (d, 1H, J=1.8 Hz), 3.57 (s, 2H), −0.06 (s, 3H), −0.11 (s, 3H).

Dimethylbis(3-phenyl-1H-inden-2-yl)silane (L116)

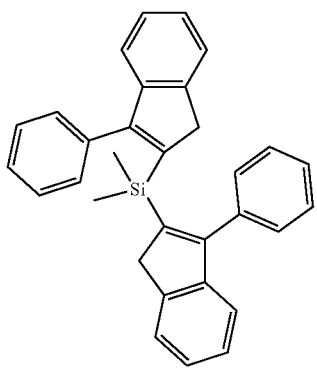 [SMILES: C[Si](C)(C1=C(c2ccccc2)c2ccccc2C1)C1=C(c2ccccc2)c2ccccc2C1]

tert-Butyllithium in pentane (65.0 ml, 111 mmol, 1.7 M) was added dropwise to a solution of 10.0 g (36.9 mmol) of 2-bromo-3-phenyl-1H-indene in 250 ml of dry ether at −80° C., and the formed mixture was stirred for 1 h at −80° C. Dichlorodimethylsilane (2.38 g, 18.5 mmol) was added at −80° C., the obtained mixture was allowed to warm slowly to room temperature and stirred overnight. The resulting mixture was poured into water, the organic layer was separated, and the aqueous layer was extracted with ether (2×100 ml). The combined extract was dried over anhydrous sodium sulfate and then evaporated to dryness. The residue was purified by flash chromatography on silica gel 60 (40-64 um) using hexane-dichloromethane mixture (10:1, vol.) as eluent to afford 1.60 g (20%) of the title compound as viscous oil.

$^1$H NMR (400 MHz, CDCl$_3$): δ 7.47-7.49 (m, 2H), 7.22-7.31 (m, 14H), 7.12-7.15 (m, 2H), 3.39 (s, 4H), −0.04 (s, 6H).

Cat 83

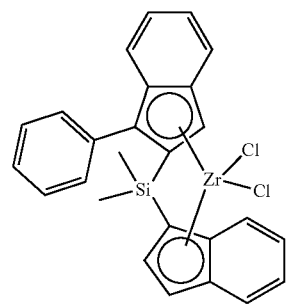

According to the general procedure 2, 1.10 g (21%) of the title compound was obtained from 3.70 g (10.1 mmol) of L83 in 100 ml of ether, 8.10 ml (20.2 mmol, 2.5 M) of n-butyllithium, and 2.35 g (10.1 mmol) of zirconium tetrachloride. The product was ca. 1:1 mixture of two isomers (A and B) according to NMR.

$^1$H NMR (400 MHz, CD$_2$Cl$_2$, mixture of isomers A and B): δ 7.17-7.65 (m, 11H in A+14H in B), 6.97 (d, 1H (in A), J=3.1 Hz), 6.74-6.78 (m, 1H in A), 6.45 (d, 1H (in A), J=8.7 Hz), 6.23 (d, 1H (in A), J=3.2 Hz), 6.18 (s, 1H in A), 6.14 (s, 1H in B), 5.96 (d, 1H (in B), J=4.0 Hz), 1.10 (s, 3H in B), 0.95 (s, 3H in A), 0.93 (s, 3H in A), 0.61 (s, 3H in B).

Cat 85 and Cat 86

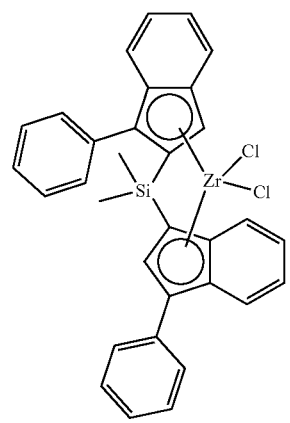

According to the general procedure 2, 1.30 g (16%) of Cat 85 and 1.50 g (17%) of the isomeric Cat 86 were obtained from 6.10 g (13.8 mmol) of L85 in 200 ml of ether, 11.1 ml (27.7 mmol, 2.5 M) of n-butyllithium, and 3.20 g (13.8 mmol) of zirconium tetrachloride. Cat 85 was precipitated as described in general procedure, whereas the isomeric compound, i.e. Cat 86, was isolated from the mother liquor, and it was contaminated with ca. 6 mol. % of Cat 85 according to NMR spectrum.

$^{1}$H NMR of Cat 85 (400 MHz, CD$_{2}$Cl$_{2}$): δ 7.78 (d, 1H, J=8.9 Hz), 7.66-7.68 (m, 1H), 7.34-7.51 (m, 12H), 7.21-7.25 (m, 3H), 6.75-6.79 (m, 1H), 6.45-6.47 (d, 1H, J=8.5 Hz), 6.24 (s, 1H), 6.15 (s, 1H), 1.02 (s, 3H), 0.97 (s, 3H).

$^{1}$H NMR of Cat 86 (400 MHz, CD$_{2}$Cl$_{2}$): δ 7.87 (d, 1H, J=8.7 Hz), 7.63 (d, 1H, 8.7 Hz), 7.33-7.55 (m, 14H), 7.20-7.24 (m, 3H), 6.25 (s, 1H), 5.97 (s, 1H), 1.17 (s, 3H), 0.62 (s, 3H).

Cat 87

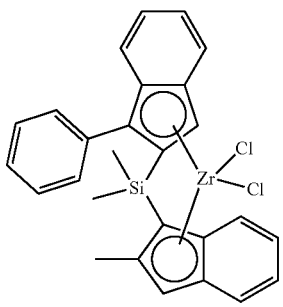

According to the general procedure 2, 1.65 g (28%) of the title compound was obtained from 4.10 g (10.8 mmol) of L87 in 200 ml of ether, 8.70 ml (21.6 mmol, 2.5 M) of n-butyllithium, and 2.50 g (10.8 mmol) of zirconium tetrachloride.

$^{1}$H NMR (400 MHz, CD$_{2}$Cl$_{2}$): δ 7.68 (d, 1H, J=7.7 Hz), 7.50 (d, 1H, J=8.5 Hz), 7.18-7.42 (m, 9H), 6.75 (s, 1H), 6.63-6.67 (m, 1H), 6.45 (d, 1H, J=8.7 Hz), 6.23 (s, 1H), 2.37 (s, 3H), 1.07 (s, 3H), 0.92 (s, 3H).

Cat 88

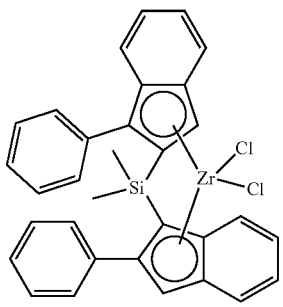

According to the general procedure 2, 2.10 g (31%) of the title compound was obtained from 5.00 g (11.3 mmol) of L88 in 200 ml of ether, 9.10 ml (22.6 mmol, 2.5 M) of n-butyllithium, and 2.65 g (11.3 mmol) of zirconium tetrachloride.

$^{1}$H NMR (400 MHz, CD$_{2}$Cl$_{2}$): δ 7.74-7.76 (m, 2H), 7.59 (d, 2H, J=8.5 Hz), 7.42-7.48 (m, 9H), 7.28-7.32 (m, 2H), 7.20-7.26 (m, 2H), 6.97 (s, 1H), 6.74-6.79 (m, 1H), 6.67 (d, 1H, J=8.7 Hz), 5.84 (s, 1H), 0.88 (s, 3H), 0.45 (s, 3H).

Cat 89 and Cat 90

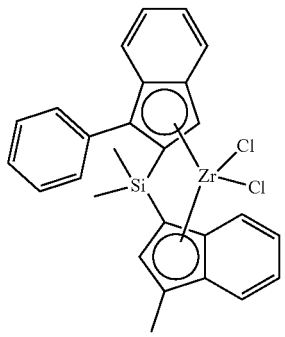

According to the general procedure 2, 0.70 g (17%) of the Cat 89 and 0.30 g (4.3%) of the isomeric Cat 90 were obtained from 2.60 g (6.90 mmol) of L89 in 100 ml of ether, 5.50 ml (13.8 mmol, 2.5 M) of n-butyllithium, and 1.60 g (6.90 mmol) of zirconium tetrachloride. Cat 89 was precipitated as described in the general procedure and contained 0.5 equiv of cocrytallized toluene. According to NMR spectroscopy, a ca. 42:58 mixture of Cat 90 and Cat 89 (the latter with 0.5 equiv of toluene) was isolated from the mother liquor.

$^{1}$H NMR of Cat 89 (400 MHz, CD$_{2}$Cl$_{2}$): δ 7.68 (d, 1H, J=8.1 Hz), 7.11-7.45 (m, 10H+5H in toluene), 6.73-6.77 (m, 1H), 6.43 (d, 1H, J=8.9 Hz), 6.05 (s, 1H), 5.86 (s, 1H), 2.42 (s, 3H), 2.34 (s, 3H in toluene), 0.90 (s, 3H).

$^{1}$H NMR of Cat 90 (400 MHz, CD$_{2}$Cl$_{2}$, mixture of Cat 89 and Cat 90): δ 7.67-7.69 (m, 1H in Cat 89), 7.56-7.59 (m, 1H in Cat 90), 7.13-7.55 (m, 12H in Cat 90+10H in Cat 89+5H in toluene), 6.73-6.77 (m, 1H in Cat 89), 6.43 (d, 1H (in Cat 90), J=8.7 Hz), 6.16 (s, 1H in Cat 90), 6.05 (s, 1H in Cat 89), 5.86 (s, 1H in Cat 89), 5.86 (s, 1H in Cat 90), 5.51 (s, 1H), 2.42 (s, 6H), 2.34 (s, 3H in toluene), 1.10 (s, 3H in Cat 90), 0.91 (s, 3H in Cat 89), 0.90 (s, 3H in Cat 89), 0.60 (s, 3H in Cat 90).

Cat 91

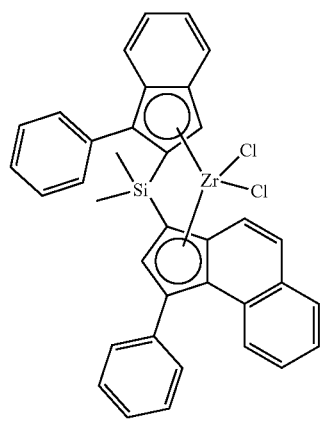

According to the general procedure 2, 2.20 g (28%) of the title compound was obtained from 5.15 g (10.5 mmol) of L91 in 200 ml of ether, 8.40 ml (21.0 mmol, 2.5 M) of n-butyllithium, and 2.45 g (10.5 mmol) of zirconium tetrachloride. The product contained 1 equiv of cocrystallized toluene.

$^1$H NMR (400 MHz, CD$_2$Cl$_2$): δ 8.16 (d, 1H, J=8.3 Hz), 7.71-7.76 (m, 2H), 7.42-7.57 (m, 13H), 7.14-7.33 (m, 2H+5H in toluene), 6.96 (d, 1H, J=8.9 Hz), 6.33 (d, 1H, J=9.0 Hz), 6.20 (s, 1H), 2.34 (s, 3H in toluene), 6.12 (s, 1H), 1.08 (s, 3H), 0.94 (s, 3H).

Cat 116 (Comparative)

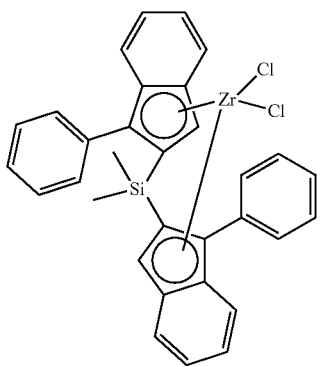

According to the general procedure 2, 0.30 g (7%) of the title compound was obtained from 3.15 g (7.10 mmol) of L116 in 150 ml of ether, 5.70 ml (14.3 mmol, 2.5 M) of n-butyllithium, and 1.66 g (7.10 mmol) of zirconium tetrachloride.

$^1$H NMR (400 MHz, CD$_2$Cl$_2$): δ 7.71-7.73 (m, 4H), 7.42-7.46 (m, 9H), 7.21-7.25 (m, 5H), 0.47 (s, 6H).

Cat 130 was prepared in a method analoguous to the method as teached in *Macromolecules* 2004 (Waymouth et al.)

Polymerizations

The polymerizations were carried out in a Parallel Pressure Reactor (PPR48) for olefin polymerization. This equipment, containing 48 reactors mounted in a triple glove-box, was sold commercially by the company Symyx, thereafter by the company Freeslate. The applied polymerization protocols were as follows:

Prior to the execution of a library, the 48 PPR cells (reactors) undergo 'bake-and-purge' cycles overnight (8 h at 90-140° C. with intermittent dry N2 flow), to remove any contaminants and left-overs from previous experiments. After cooling to glove-box temperature, the stir tops are taken off, and the cells are fitted with disposable 10 mL glass inserts and PEEK stirring paddles (previously hot-dried under vacuum); the stir tops are then set back in place, the cells are loaded with the proper amounts of toluene (in the range 2.0-4.0 mL), 1-hexene (in the range 0.05-2.0 mL) and MAO solution (100 μL of 0.1 mol L-1 in toluene), thermostated at 80° C., and brought to the operating pressure of 65 psig with ethylene. At this point, the catalyst injection sequence is started; proper volumes of a toluene 'chaser', a solution of the precatalyst in toluene (typically in the range 0.005-0.05 mmol L-1), and a toluene 'buffer' are uptaken into the slurry needle, and then injected into the cell of destination. The reaction is left to proceed under stirring (800 rpm) at constant temperature and pressure with continuous feed of ethylene for 5-60 min, and quenched by over-pressurizing the cell with dry air (preferred to other possible catalyst poisons because in case of cell or quench line leaks oxygen is promptly detected by the dedicated glove-box sensor).

After quenching, the cells are cooled down and vented, the stir-tops are removed, and the glass inserts containing the reaction phase are taken out and transferred to a Genevac EZ2-Plus centrifugal evaporator, where all volatiles are distilled out and the polymers are thoroughly dried overnight. Reaction yields are double-checked against on-line monomer conversion measurements by robotically weighing the dry polymers in a Bohdan Balance Automator while still in the reaction vials (subtracting the pre-recorded tare). Polymer aliquots are then sampled out for the characterizations.

GPC Analysis

GPC curves are recorded with a Freeslate Rapid GPC setup, equipped with a set of 2 mixed-bed Agilent PLgel 10 μm columns and a Polymer Char IR4 detector. The upper deck of the setup features a sample dissolution station for up to 48 samples in 10 mL magnetically stirred glass vials, 4 thermostated bays each accommodating 48 polymer solutions in 10 mL glass vials, and a dual arm robot with two heated injection needles. With robotic operation, pre-weighed polymer amounts (typically 1-4 mg) are dissolved in proper volumes of orthodichlorobenzene (ODCB) containing 0.40 mg mL-1 of 4-methyl-2,6-di-tert-butylphenol (BHT) as a stabilizer, so as to obtain solutions at a concentration of 0.5 to 1.0 mg mL-1. After 2-4 h at 150° C. under gentle stirring to ensure complete dissolution, the samples are transferred to a thermostated bay at 145° C., and sequentially injected into the system at 145° C. and a flow rate of 1.0 mL min-1. In post-trigger delay operation mode, the analysis time is 12.5 min per sample. Calibration is carried out with the universal method, using 10 monodisperse polystyrene samples (Mn between 1.3 and 3700 KDa).

NMR Characterizations

13C NMR spectra are recorded with a Bruker Avance 400 III spectrometer equipped with a 5 mm High Temperature Cryoprobe, and a robotic sample changer with pre-heated carousel (24 positions). The samples (20-30 mg) are dissolved at 120° C. in tetrachloroethane-1,2-d2 (0.6 mL), added with 0.40 mg mL-1 of BHT as a stabilizer, and loaded in the carousel maintained at the same temperature. The spectra are taken sequentially with automated tuning, matching and shimming. Typical operating conditions for routine measurements are: 45° pulse; acquisition time, 2.7 s; relaxation delay, 5.0 s; 400-800 transients (corresponding to an analysis time of 30-60 min). Broad-band proton decoupling is achieved with a modified WALTZ16 sequence (BI_WALTZ16_32 by Bruker).

Polymerization Results

The results of the polymerization tests are summarized in Table 1a and 1b.

TABLE 1a

Polymerization results part 1

| Catalyst | $H_{feed}$ (%, v/v) | Activity[a] | $M_n$ (kDa) | $M_w$ (kDa) | PDI | $H_{cop}$ mol % (NMR) |
|---|---|---|---|---|---|---|
| Cat83 | 0 | 477 | | | | |
| | 5 | 2934 | 48 | 102 | 2.1 | 2.7 |
| Cat85 | 0 | 5106 | | | | |
| | 10 | 8072 | 37 | 75 | 2 | |
| | 40 | 6161 | 35 | 71 | 2 | 5 |
| Cat86 | 0 | 1264 | | | | |
| | 5 | 2538 | 38 | 79 | 2.1 | 2 |
| Cat87 | 0 | 1518 | | | | |
| | 2 | 1526 | 97 | 229 | 2.4 | 2 |
| | 5 | 1548 | 58 | 158 | 2.7 | 4.5 |
| Cat88 comparative | 0 | 42 | | | | |
| | 5 | 17 | 41 | 104 | 2.5 | 5 |
| Cat89 | 0 | 5222 | | | | |
| | 5 | 3111 | 37 | 85 | 2.3 | 1 |

[a]Activity in kg polymer per mmol catalyst per mol ethylene in the diluent per hour
PDI = Mw/Mn
Hcop = hexene incorporation in the copolymer, determined by $^{13}$C-NMR

| Catalyst | Cat83 | | Cat85 |
|---|---|---|---|

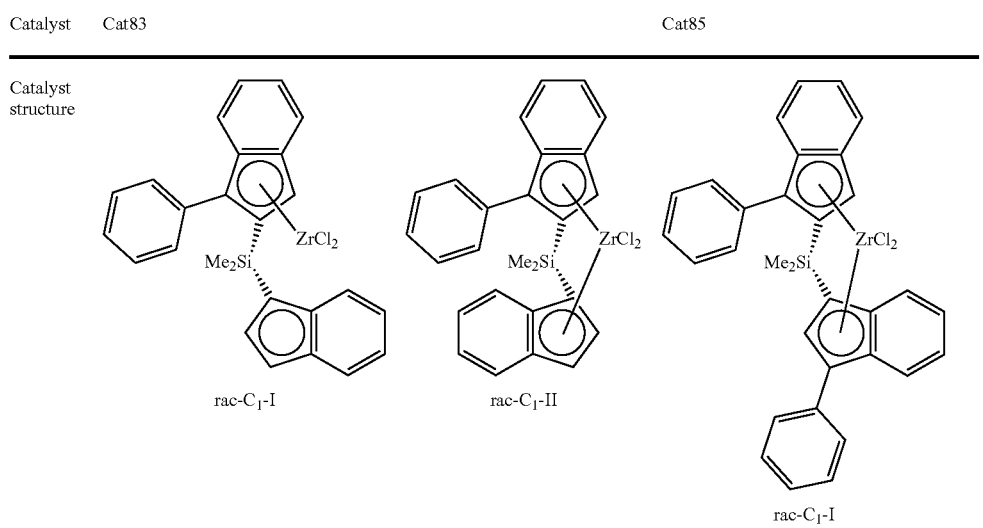

Catalyst structure rac-$C_1$-I     rac-$C_1$-II     rac-$C_1$-I

| Catalyst | Cat86 | Cat87 |
|---|---|---|

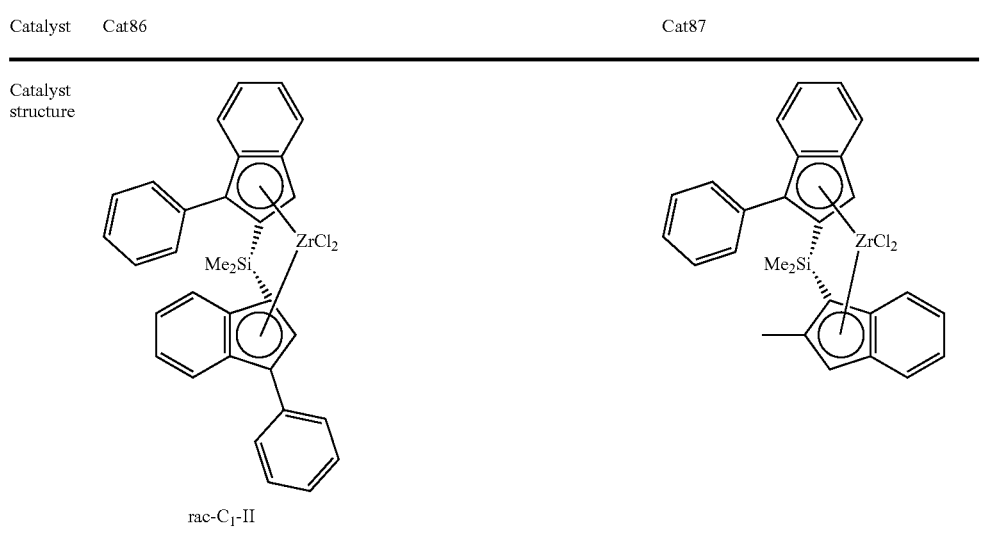

Catalyst structure rac-$C_1$-II

| Catalyst | Cat88 | Cat89 |
|---|---|---|
| Catalyst structure | 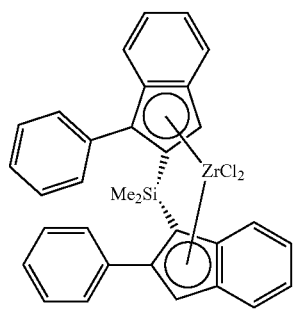 | 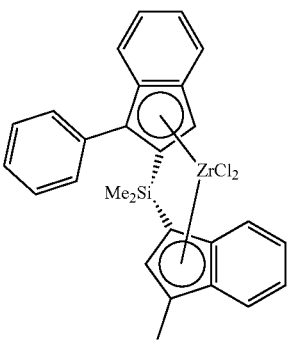 |

TABLE 1b

Polymerization results part 2

| Catalyst | $H_{feed}$ (%, v/v) | Activity[a] | $M_n$ (kDa) | $M_w$ (kDa) | PDI | $H_{cop}$ mol % (NMR) |
|---|---|---|---|---|---|---|
| Cat90 | 0 | 1339 | | | | |
| | 5 | 1831 | 42 | 92 | 2.2 | 1 |
| Cat91 | 0 | 2906 | | | | |
| comparative | 5 | 2354 | 60 | 130 | 2.2 | 0.7 |
| Cat116 | 0 | 76 | | | | |
| comparative | 5 | 71 | 23 | 51 | 2.2 | 1.6 |
| Cat84 | 0 | 352 | | | | |
| comparative | 10 | 308 | 30 | 67 | 2.3 | 2 |
| | 40 | 295 | 9 | 24 | 2.6 | 6.5 |
| Cat130 | No | 359 | | | | |
| comparative | 1 | 1231 | 88 | 195 | 2.2 | 1.5 |
| | 2 | 884 | 82 | 167 | 2 | 3.1 |
| | 5 | 220 | 37 | 96 | 2.6 | 6.8 |
| Cat82 | 0 | 900 | | | | |
| comparative | 5 | 3158 | 17 | 35 | 2.1 | 1.3 |

[a]Activity in kg polymer per mmol catalyst per mol ethylene in the diluent per hour
PDI = Mw/Mn
Hcop = hexene incorporation in the copolymer, determined by $^{13}$C-NMR

| Catalyst | Cat90 | | Cat91 |
|---|---|---|---|
| Catalyst structure | 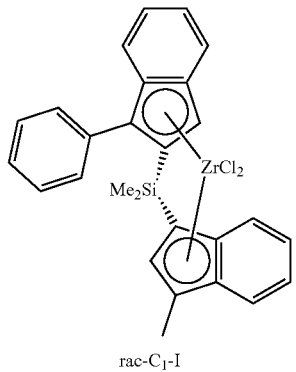 | 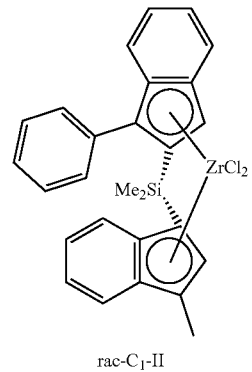 | 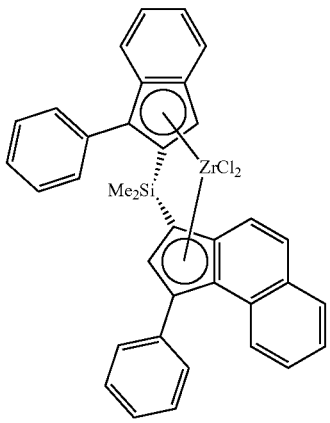 |
| | rac-$C_1$-I | rac-$C_1$-II | |

| Catalyst | Cat116 | Cat84 | Cat130 |
|---|---|---|---|
| Catalyst structure | | | |

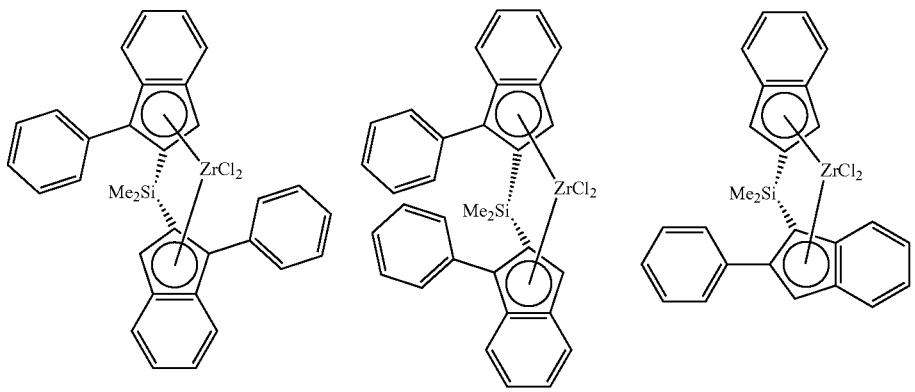

| Catalyst | Cat82 |
|---|---|
| Catalyst structure | |

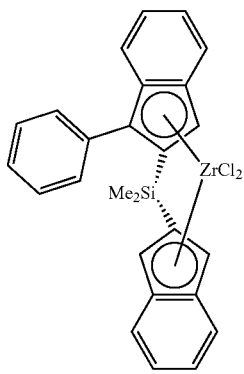

When comparing comparative catalyst 82 with inventive catalyts 83 it is evident that metallocenes bearing two 2-indenyl ligands (as in 82) lead to very low Mw. Also other bis-2-indenyl catalysts like 84 and 116 do not lead to high molecular weight copolymers.

Catalyst 82

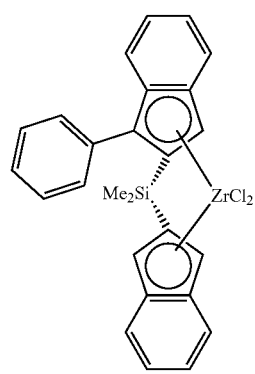

-continued

Catalyst 83

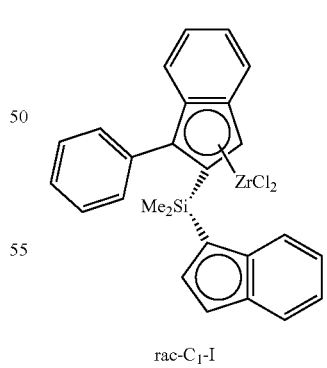 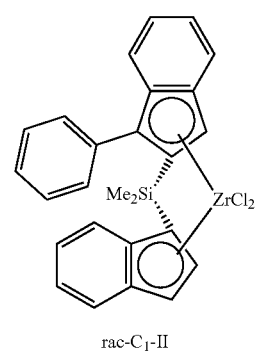

rac-C₁-I        rac-C₁-II

When comparing comparative catalyst 130 (as described by Waymouth et al.) with the catalyst 88, it is surprising to see the low activity of the latter. This observation teaches away from 1-phenyl substituted 2-indenyl to improve the catalyst performance.

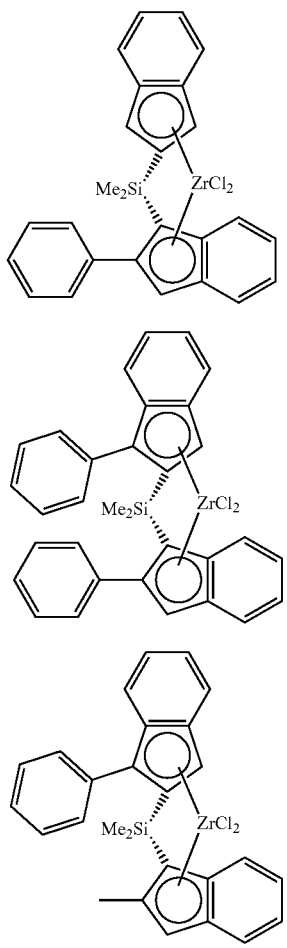

Catalyst 130

Catalyst 88

Catalyst 87

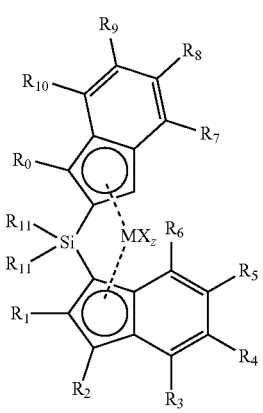

Surprisingly, when replacing the phenyl group on the 2-position of the 1-indenyl moiety of catalyst 88 by an alkyl group as in inventive catalyst 87, the molecular weight of the copolymer is improved and the activity is high.

The invention claimed is:

1. A metallocene complex according to formula A:

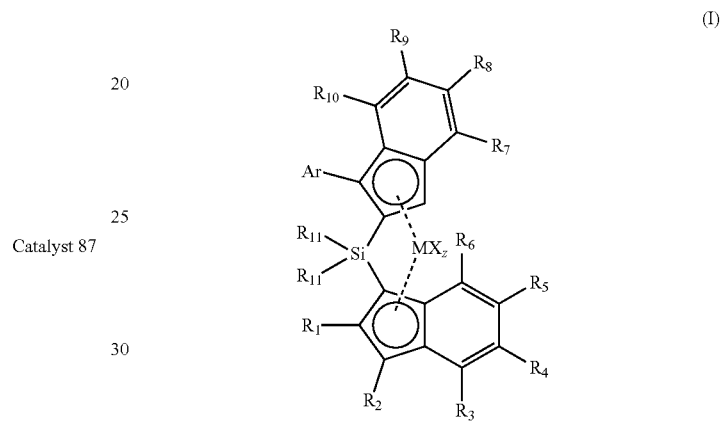

(A)

wherein R1-R10 are independently selected from H, C1-C10 alkyl groups, C7-C20 aralkyl groups, or C1-C10 alkoxy groups;

wherein R2 may be a C6 aryl group;

wherein R11 is selected from methyl, ethyl, propyl, isopropyl, butyl, or phenyl;

wherein R1 and R2, R3 and R4, R4 and R5, R5 and R6, R7 and R8, R8 and R9, and/or R9 and R10 may be connected to form a ring structure;

wherein R0 is selected from a C1-C10 alkyl group or an aryl group;

wherein M is selected from Ti, Zr, or Hf, X is an anionic ligand to M, z is the number of X groups and equals the valence of M minus 2.

2. A metallocene complex according to claim 1, the metallocene complex having formula I, (I)

[Formula I structure]

wherein R1-R10 are independently selected from H, C1-C10 alkyl, C7-C20 aralkyl groups, or C1-C10 alkoxy groups;

wherein Ar is an aryl group;

wherein R11 is selected from methyl, ethyl, propyl, isopropyl, butyl, or phenyl;

wherein R1 and R2, R3 and R4, R4 and R5, R5 and R6, R7 and R8, R8 and R9, and/or R9 and R10 may be connected to form a ring structure;

wherein M is selected from Ti, Zr, or Hf, X is an anionic ligand to M, z is the number of X groups and equals the valence of M minus 2.

3. The metallocene complex according to claim 1, wherein M is zirconium or hafnium.

4. The metallocene complex according to claim 1, wherein X is a methyl group, Cl, Br or I.

5. The metallocene complex according to claim 1, wherein R1 is selected from methyl, ethyl, or isopropyl and/or R2 is a methyl, ethyl, or phenyl group and R3, R4, R5 and R6 are H.

6. The metallocene complex according to claim 1, wherein R1 is H, when R2 is other than H.

7. The metallocene complex according to claim 1, wherein R2 is selected from H, methyl, ethyl, phenyl, 2-methyl-1-phenyl, or 3,5-dialkyl-1-phenyl.

8. The metallocene complex according to claim 1, wherein R2 is selected from H, methyl, ethyl, or phenyl.

9. The metallocene complex according to claim 1, wherein R2 is H when R1 is other than H.

10. The metallocene complex according to claim 1, wherein R5 and R6 are H atoms and wherein R1 is selected from H, methyl, ethyl, or isopropyl.

11. The metallocene complex according to claim 1, wherein R7-R10 are independently selected from H, methyl, ethyl or methoxy.

12. The metallocene complex according to claim 1, wherein R7-R10 are H.

13. The metallocene complex according to claim 1, wherein the R11 is a methyl group.

14. The metallocene complex according to claim 1, wherein the metallocene complexes is selected from the group consisting of:

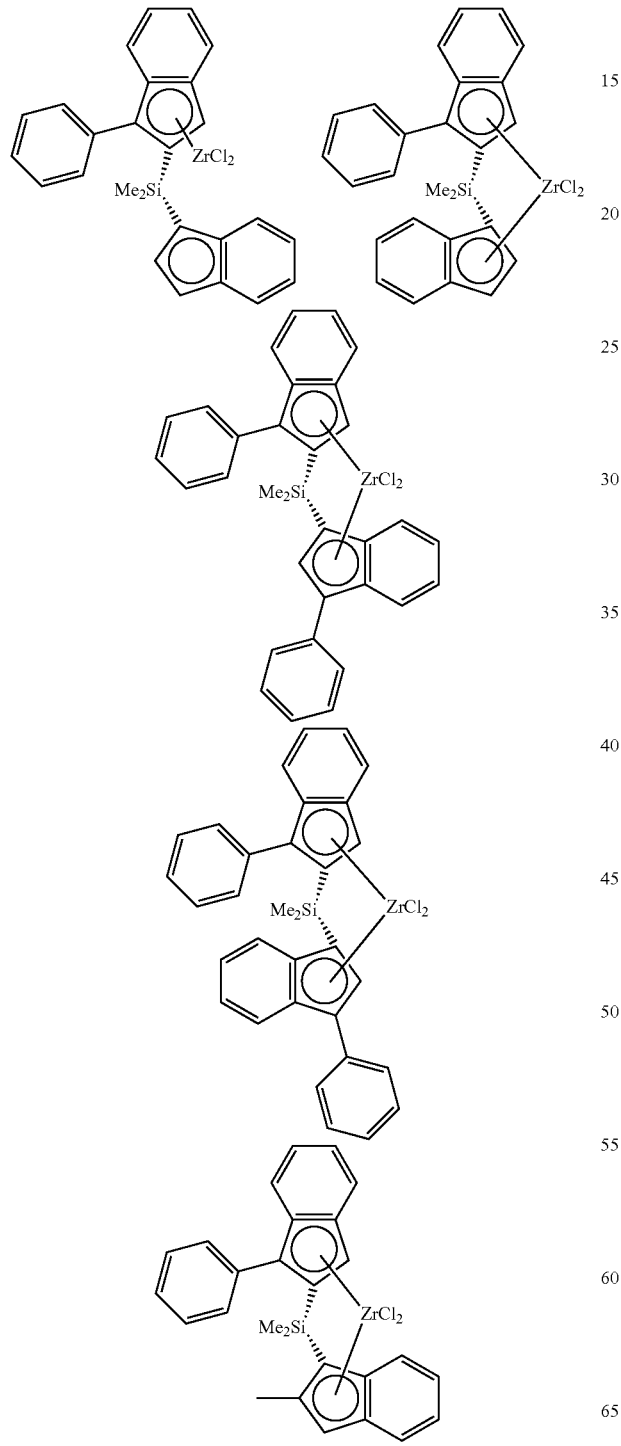

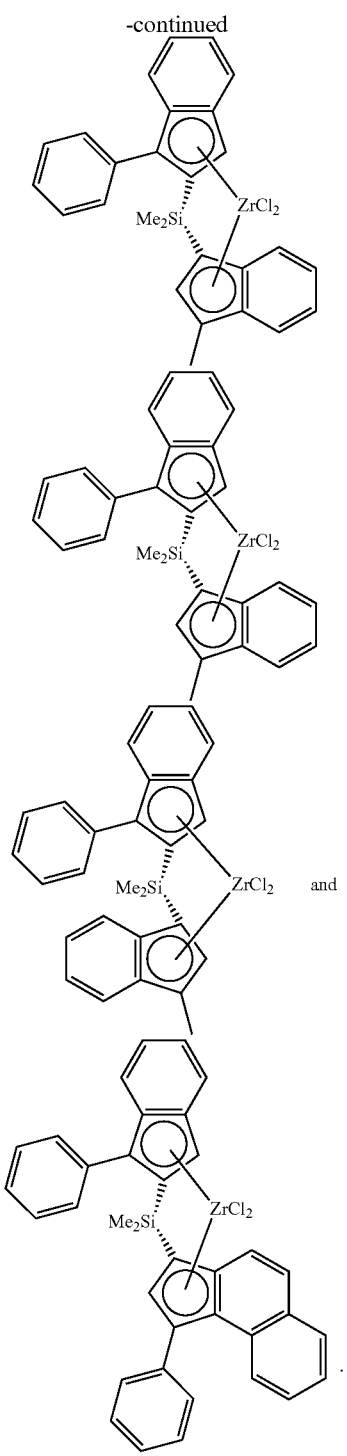

15. The metallocene complex according to claim 1, wherein the metallocene complex is immobilized on a support.

16. An olefin polymerization catalyst prepared from the metallocene complex according to claim 1 and a cocatalyst.

17. A process for the preparation of olefin polymers, the process comprising polymerizing one or more olefins in the presence of a cocatalyst and the metallocene complex according to claim 1, wherein the metallocene complex optionally is immobilized on a support.

18. An article prepared from a polyolefin as obtained in the process according to claim 17.

\* \* \* \* \*